United States Patent [19]
Nunnally

[11] Patent Number: 5,869,200
[45] Date of Patent: Feb. 9, 1999

[54] MAGNETIC SLURRY FUELED BATTERY SYSTEM

[75] Inventor: William C. Nunnally, Columbia, Mo.

[73] Assignee: SunSave, Inc., Tulsa, Ohio

[21] Appl. No.: 909,929

[22] Filed: Aug. 12, 1997

[51] Int. Cl.⁶ .............................. H01M 2/00; H01M 6/24; H01M 8/18
[52] U.S. Cl. .............................. 429/10; 429/19; 429/105
[58] Field of Search .................................. 429/10, 19, 17, 429/15, 101, 105

[56] References Cited

U.S. PATENT DOCUMENTS

| | | |
|---|---|---|
| 3,322,574 | 5/1967 | Justi et al. . |
| 3,409,471 | 11/1968 | Sturm et al. . |
| 3,493,436 | 2/1970 | Johnsen ....................................... 429/10 |
| 3,525,643 | 8/1970 | Spahrbier et al. . |
| 3,540,934 | 11/1970 | Boeke . |
| 3,773,559 | 11/1973 | Warszawski et al. . |
| 3,811,952 | 5/1974 | Siwersson et al. ......................... 429/10 |
| 4,042,754 | 8/1977 | Borello ....................................... 429/10 |
| 4,105,829 | 8/1978 | Venero . |
| 4,192,910 | 3/1980 | Giner et al. . |
| 4,220,690 | 9/1980 | Blurton et al. . |
| 4,311,771 | 1/1982 | Walther . |
| 4,321,312 | 3/1982 | Fujii et al. . |
| 4,370,392 | 1/1983 | Savinelli et al. . |
| 4,469,759 | 9/1984 | Newill ........................................ 429/10 |
| 4,469,760 | 9/1984 | Giner et al. . |
| 4,485,154 | 11/1984 | Remick et al. . |
| 4,492,741 | 1/1985 | Struthers . |
| 4,514,473 | 4/1985 | Atkin et al. ................................. 429/10 |
| 4,783,381 | 11/1988 | Tytgat et al. . |
| 4,814,241 | 3/1989 | Nagashima et al. . |

*Primary Examiner*—Anthony Skapars
*Attorney, Agent, or Firm*—Mark A. Rogers; Gary N. Speed; Mark M. Henry

[57] ABSTRACT

A battery system and method of operation are shown. The battery system utilizes a microparticle fuel slurry containing microparticle spheres surrounded by active electrochemical material. In the operation of the battery system, the microparticle spheres are attracted to battery-cell electrode plates and held there by a magnetic field. The core of the microparticle spheres and battery-cell electrode plates may be permanently magnetic or ferromagnetic in nature. The magnetic field may originate from permanently magnetic materials or be induced using magnetic field windings or the like. The battery system may be recharged by replacing spent microparticle fuel slurry with unspent slurry. In some applications, such as when used to power an electro-motive vehicle, a reserve of unspent microparticle fuel slurry may be stored on-board the vehicle and used to periodically replace spent microparticle fuel slurry during operation. In such applications, when the on-board storage of unspent fuel slurry has been spent, the battery system may be refueled with a new supply of unspent fuel slurry without interrupting operation of the battery.

13 Claims, 7 Drawing Sheets

MAGNETIC SLURRY FUELED BATTERY SYSTEM

BACKGROUND OF THE INVENTION

1. Field of the Invention

This invention relates generally to battery/fuel cell technologies, and more specifically to rechargeable battery. In particular, this invention relates to the construction of battery electrodes and an energy storage medium that allows recharging the battery by replacement of the energy storage medium rather than by conventional recharging techniques, such as by reverse chemical reactions driven by the application of electrical energy or replacement of battery electrodes. The rechargeable batteries of the present invention are particularly suited for use with electro-motive vehicles and bulk energy storage systems.

2. Description of the Related Art

With the increasing awareness of environmental damage caused by the combustion of fossil fuels, the search for a replacement for such fuels has intensified. Due to the large volume of greenhouse and other undesirable gases produced by the internal combustion engines used to power motor vehicles, it has become especially critical to find a suitable non-polluting replacement power source for these transportation vehicles. One promising replacement for the fossil fuel powered vehicle so prevalent today is the electro-motive vehicle. However, before the electro-motive vehicle will become a practical replacement for these vehicles, one major obstacle must be overcome. This major obstacle is the development of a means for storing and converting electrical energy which will allow an electro-motive vehicle to deliver the acceleration and range performance similar to that obtained now by internal combustion engines. To date, this obstacle has not been surmounted.

Electro-motive vehicles commonly use batteries to store and convert chemically stored energy to electrical energy required for operation. In these and other applications where large amounts of electrical power and energy are required, the present state of the art requires that the volume and weight of batteries be very large and that the batteries be subjected to a lengthy recharge period on a regular basis. In many cases, these characteristics are not desirable, and have hindered the widespread development of the electro-motive vehicle applications.

For example, in applications such as those involving electric vehicles, the total amount of electrical power required is large to provide the desired acceleration and the energy requirements are large to provide the desired range. The resulting volume and weight of the batteries is excessive and must be minimized to make electric vehicles practical as well as cost effective. In addition, the recharge time must be minimized to make electric vehicle use practical. Conventional batteries are poor candidates for electric vehicles because they also require a long time period to recharge that is unacceptable to customers that are familiar with internal combustion engine powered vehicles. This characteristic is primarily due to the fact that all available electrode material must be replenished through electrochemical reactions during the recharge cycle to increase the energy storage density and thus the time between recharging.

Batteries typically store energy chemically in compounds deposited on the battery electrodes or plates. Electrical current is generated through chemical reactions at the plate or electrode surfaces, which convert the plate compound to another compound and produce an ion or electron. Ions are then transported through the electrolyte between the plates to complete the electrical circuit. Therefore, when the compounds deposited on the electrodes have all been chemically converted, the battery is discharged and the available energy is zero.

In a typical electrochemical battery system, the chemical reactions occurring at the electrode plates are classified as oxidation and reduction. The electrode plate where oxidation occurs is called the anode because electrons are produced in the electrode plate material during the oxidation reaction. Conversely, the electrode plate where reduction occurs is called the cathode because electrons are used during the reduction reaction. The combination of a given anode material with a given cathode material is known as an electrochemical couple. The selection of the electrochemical materials that make up an electrochemical couple is made by comparing the tendency of each material to undergo a reduction reaction when coupled to a standard hydrogen electrode, known as the "standard reduction potential". The material with the higher standard reduction potential is selected for the cathode and the material with the lower reduction potential is selected for the anode. The difference in the standard reduction potential between the two materials determines the voltage generated by the electrochemical couple.

For conventional batteries, the amount of energy storage in a battery depends upon the amount of chemical compounds that are in contact with the battery electrodes. The rate at which battery energy can be supplied or the power can be made available is dependent upon a number of parameters, including the electrode surface area available for chemical reactions to take place. Conventional batteries use porous electrode plates to increase the area of the electrode surface available for chemical reactions. High power density batteries or batteries that can provide a large energy in a short period of time require chemical access to a large volume or surface area of active chemical compounds on the battery plates. For example, in a common lead acid battery in the charged state, one of the active chemical plates consists of lead, which is present in a "spongy" form to increase the active surface area. The surface of the lead plate or electrode is converted to lead sulphate during discharge to a depth determined by the penetration of the chemical reaction into the surface. Thus, in a conventional lead acid battery, only a small fraction of the lead plate or electrode surface is exposed to the electrolyte in the electrical energy conversion process such that chemical reactions must diffuse through previously converted material.

Batteries for electric vehicles are designed primarily around two specifications, the required power necessary for acceleration and the required energy required for range of travel. For example, a 200 hp equivalent electric motor requires a peak electrical power source of approximately 150 kW. Secondly, the continuous power required to cruise an electric vehicle at 70 mph is approximately 25 kW. A three hour cruise would require a battery to deliver a total energy of 75 kW-hr and result in a range of 210 miles. A reasonable battery weight for a full sized vehicle is approximately 330 lbs or 150 kG which results in a desired power density of 1000 W/kG and an energy density of 500 W-hr/kG. Conventional batteries can deliver only about 1/10 th of the power density and the energy density desired above resulting in a battery weight of 3300 lbs. Thus existing batteries result in a system weight which is approximately 10 times that desired.

One way of reducing battery weight and increasing the run time between recharge cycles is to increase the energy density of the battery. The energy stored in a battery is dependent upon the chemical characteristics of the electrochemical couples selected for use in the battery. Because the battery volume must contain all of the electrochemical energy in the form of active material in contact with the battery electrodes or plates, a lot of effort has been expended in the past toward developing high-energy electrochemical couples to increase the battery electrochemical energy density.

Another way of reducing battery weight and increasing effective run time is by altering the physical design of the battery electrode plates. Recharging a battery restores the active compounds on the battery plates through reverse chemical reactions driven by the application of electrical energy. Recharging a battery takes a long period of time due to the nature of the chemical reaction and the desire to restore the active compounds through chemical reactions as far as possible into the surface of the battery plates. Restoring the active materials through chemical reactions is very slow since the reactions take place at the surface of the material and migration of the reformed material into the interior of the electrode is extremely time consuming, if possible at all.

The size and weight of the battery could be reduced if a small layer of active material could be continually replaced on the electrode surface as other active material is converted during discharge. In the past, several mechanical schemes have been innovated to physically move or replace the plates in a battery so as to improve the access of the electrolyte chemical to the plate or electrode material and to increase the amount of energy produced by the battery. The goal of this prior research has been to create a battery in which the active chemical material could be replaced periodically with a liquid material in a manner similar to refueling a conventional combustion engine using liquid fuel or in which the active chemical material could be replaced continually during operation as in a fuel cell. In this manner, the energy storage function of the battery could be separated from the energy conversion function and each optimized to provide an improved energy storage and conversion system.

Still other ways of improving the efficiency and output of battery cells have been attempted. For example, U.S. Pat. No. 3,409,471 to Sturm et al. discloses a method for operating a catalytic battery system utilizing magnetic fields and ferromagnetic catalyst materials.

In this system, loose ferromagnetic catalyst materials are mixed with electrolyte and charged with an electro-active gas or organic compound by adsorption. Catalysis is a three body situation where the presence of the catalyst increases the probability of reaction between the other two bodies. By definition, a catalyst is not used up in a reaction, but is used to encourage a reaction. Acceptable compounds for absorption on the ferromagnetic carrier of the catalyst, described in this patent are $H_2$, $O_2$, methanol and ethanol. In the operation of the catalytic battery system, the electrolyte and gas/liquid charged ferromagnetic catalyst material is placed in a cell, and the catalyst material is attracted to an electrode by a magnetic field, where the electro-active compounds undergo electron exchange and are released from the region in which the catalyst, the electrode and the fuel coincide such as the surface of the catalyst material. Although the system offers increased access to the electro-active material contained within the battery, it fails to offer the high energy density required for applications such as powering electric vehicles, because the density of the electro-active material, either gas or liquid, is insufficient to provide the current density necessary. Because the battery system relies on catalytic adsorption of electro-active compounds onto the catalyst material, these compounds are likely limited to gases and liquids.

Therefore, the range of electrochemical couples that may be used in the Sturm patent appears to be very narrow and those couples available lack the high energy density required for a practical power source for an application such as an electro-motive. As an additional disadvantage, the adsorption/desorption cycle of the catalytic battery requires that the catalyst material can only be regenerated by physical contact with the electro-active material itself rather than by more conventional recharging means, such as application of reverse current. This means that it may be necessary to handle large amounts of potentially hazardous materials, such as $H_2$ in the recharging procedure. Finally, in some cases, the limited stability of the adsorption process may render long term storage of the charged catalyst material impractical, for example, if the material must be stored under pressure in the case of gas absorption.

Despite past efforts, existing and presently planned battery systems do not provide sufficient energy storage density in a reasonably sized package so as to allow long trips in electric vehicles. In addition, existing and planned battery systems require long periods of time to recharge the energy storage medium and are limited in the number of times they may be recharged due to deterioration of battery components. Therefore, at this time electric vehicles utilizing electric energy storage systems are not economically or operationally feasible, nor do they compare in viability with other forms of transportation.

Accordingly, it is an object of the present invention to provide a battery system that is rechargeable by replacing a specially designed liquid fuel slurry in the battery, thus making the recharging process similar to refueling a gasoline powered automobile.

It is also an object of the invention to provide a battery system in which the fuel slurry is continuously replaced or recharged by circulation through the battery, as in a liquid fuel cell.

A further object of the invention is to provide a battery system in which the effective area of the battery electrode-plate surface area is increased so as to increase the stored energy density and the rate at which electric energy can be removed.

Still another object of the invention is to provide a battery system structure that can utilize different types of liquid slurry fuel so that the same battery/fuel cell structure can be used with future battery fuel slurries that have been improved or changed.

Still another object of the invention is to provide a special type of battery slurry fuel that enables the multi-fuel, rechargeable battery and liquid fuel cell concept of this invention.

Still another object of the invention is to provide a method of contacting a liquid battery fuel slurry with the battery electrode plates that is compatible with continuous or bulk liquid recharging.

Still another object of the invention is to provide a method of using solid fuel coatings on ferromagnetic carriers to provide simultaneously, the large surface area and the active material density necessary at the electrode surface to produce the large current density required for electric vehicles and bulk energy storage systems.

Other and further objects, features and advantages of the present invention will be readily apparent to those skilled in the art upon a reading of the following description of the preferred embodiments including the examples provided therewith.

SUMMARY OF THE INVENTION

The present invention addresses one or more of the disadvantages described above or otherwise known to the art.

This invention, in one broad respect is a method of continuously or periodically replacing the active chemical energy storage medium in a battery or fuel cell.

In a second broad respect, this invention is a method of providing a large surface area for electrochemcal reactions in a battery that is continually and or periodically replaced with new material.

A third broad aspect of this invention is a method of providing a large active material energy density at the electrode surface necessary for electric vehicle and bulk storage power systems.

In a further broad respect, this invention is a method for increasing the range of an electric vehicle battery/fuel cell system by storing a majority of the electrochemical energy in tanks on the vehicle and using only the required surface area necessary for power generation in the electrochemical to electrical energy converter.

In a further broad respect, this invention is a method of cooling the electrolyte slurry and removing unwanted chemical materials while recirculating the mixture through the battery/fuel cell.

In the present invention, the energy storage function is dependent upon chemical energy density and tank volume, while the energy conversion function is not hampered by energy storage considerations as in a conventional battery. The present invention replaces the active material at each electrode by replacing a liquid electrolyte containing a suspended slurry of microscopic battery fuel particles. The possible embodiments of microscopic fuel particles include ferromagnetic fullerene spheres having attached battery materials. The specially designed microparticles are then electrically connected to the battery electrodes using a magnetic field. The microparticles can be continuously replaced during operation resulting in a liquid fuel cell, or replaced in mass periodically, resulting in an electric engine. In addition, the use of a magnetic field to control battery resistivity offers the possibility of magnetic control of battery voltage and current.

The replaceable electrode/energy-storage apparatus and method of the present invention rely on electrode plates and fuel microparticles having cores capable of interacting with a magnetic field (either by responding to or producing a magnetic field) such that the microparticles are attracted to the electrode plates. The fabrication and application of ferromagnetic microspheres is common in industry. Furthermore, the bonding of materials to microspheres by coating and/or plating is also a standard technique used commonly in industry.

In the battery system of the present invention, the active material in a simple battery structure becomes a liquid fuel in which electrode material can be replaced (meaning the battery can be recharged) by tuning off the actuation magnetic field and changing the slurry within the battery in a manner similar to refueling an engine. Advantageously, then, the total chemical energy in the battery system need not be stored within the battery itself, but the majority of energy can be stored in liquid storage containers adjacent to the battery. Therefore, only the amount of fuel required to delivery the specified electrical output need be present in the battery at any one time.

The battery (fuel cell) structure is similar to an electrochemical engine in that it offers the advantage that the fuel can be synchronously and simultaneously replaced in real time in multiple battery cell combinations, to provide a multiple-phase AC or DC electrical output. Additionally, the battery/fuel cell electrode plates can be designed for specific electrical output with total energy storage capability determined by the size of the external fuel tank. This results in optimum battery size and extended range.

The battery electrode configuration of the present invention also offers significant advantages. Because the battery construction is bipolar, the electrodes are identical and the polarity can be reversed if necessary. Advantageously, the electrodes are not fuel or electrolyte sensitive, meaning that multiple types of electrochemical fuel couples can be used in the same battery (fuel-cell) structure. As a result, the same battery structure can be used with new and improved battery fuels as they are developed.

The battery fuel system of the present invention also represents a significant advance in the art. The continued effective surface area provided by the multiple layer fuel microparticles of this invention is much larger than a common battery electrode-plate, and thus the area available for chemical reaction and electrochemical to electrical-energy conversion is increased over the conventional battery. The ferromagnetic slurry battery and/or fuel cell of this invention can be rapidly recharged by changing the liquid fuel slurry within the battery using a liquid delivery system in a manner similar to refueling an internal combustion engine in an automobile or truck. As part of such a liquid delivery system, the ferromagnetic cores of the microparticle battery fuels described in this patent can be recovered and rapidly recharged (replated with new fuel) off line and replaced within the battery in a short time. The surface area presented to the electrolyte by the fuel microparticles of this invention when magnetically connected to the electrode-plates is very large and thus increases the chemical reaction rates in producing electrical energy. This invention also provides the maximum density of active material at the electrode surface because of the solid nature of the fuel. Thus this approach combines maximum surface area with maximum active material energy density at the electrode surface to enable sufficient current density for electric vehicles and bulk energy storage systems.

In addition, the battery can be cooled by the inherent flow of fuel through the battery, increasing the average power supplied by the battery. To take further advantage of this cooling effect, the electrolyte and microparticle fuel of this invention can be circulated through a heat exchanger. This feature permits higher energy and current density operation over an extended period of time when compared to conventional batteries.

In summary, the present invention offers tremendous advantages in battery performance and operation, including energy density, power density, recharging, and lifetime. The use of spherical fuel microparticles in the battery systems of this invention greatly increases the electrode surface area and thus the possible current density. In addition, the use of active material coatings on the spherical microparticles provides the maximum active material density and the maximum surface area at the electrode surface. Since the plates can easily be replaced on a regular basis, the buildup of dendrites and electrode damage is minimized to increase the battery structure lifetime. The battery charge time is reduced to the time necessary to change the fluid in the battery while the thermal problems associated with recharging are eliminated. The fuel microparticles can be recharged at the energy station using a much lower average power and the fuel microparticles can be distributed using the existing fuel networks (service stations). In the present invention, the simultaneous battery functions of chemical energy storage and chemical-to-electrical energy conversion can now be conducted separately and independently and the individual components optimized for the specific task.

Other objects and advantages of the present invention will be further appreciated from the drawings and from the detailed description provided below.

DETAILED DESCRIPTION OF THE PREFERRED EMBODIMENTS

Figure 1:
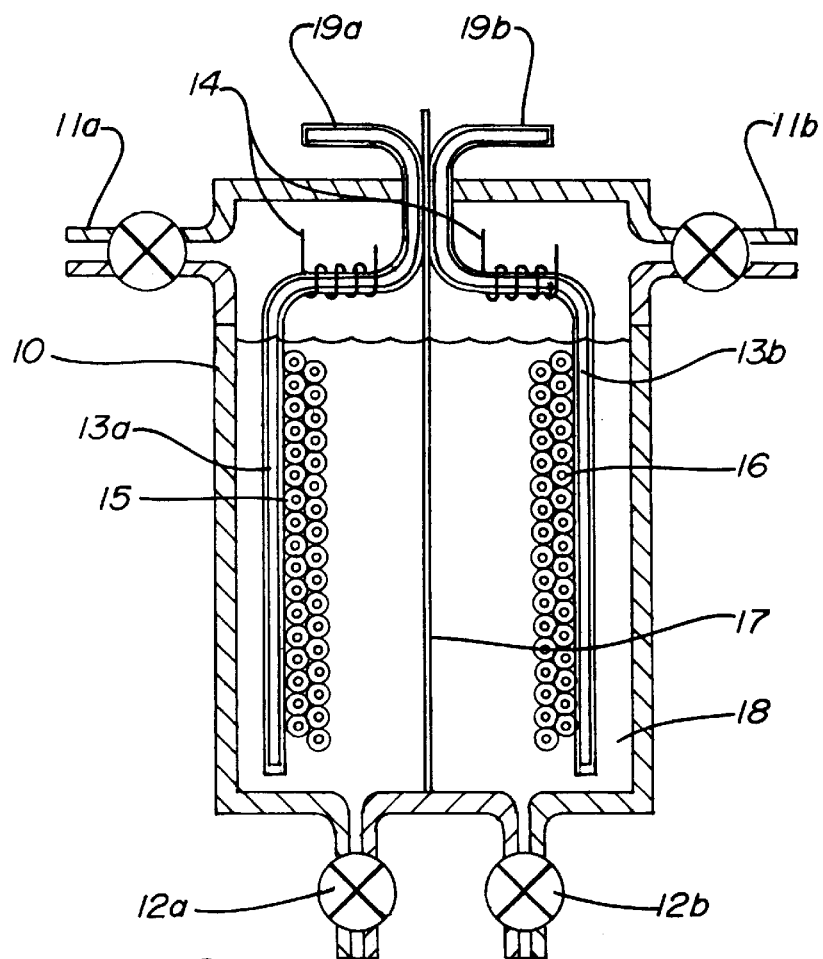
FIG. 1 shows a representation of the structure of one embodiment of the liquid rechargeable electrochemical cell container used in the battery system of the present invention.

A simple embodiment of the electrochemical cell container used in the battery system of the present invention is illustrated in FIG. 1. The battery structure is enclosed in an insulating battery cell container 10 having two unspent fuel inlets 11a and 11b, and two spent fuel outlets 12a and 12b. Two electrical-conductor coated, ferromagnetic-core electrode plates 13a and 13b are inserted into the battery-cell container and at least a portion of the plates 13a and 13b are encircled by one or more magnetic actuation windings 14. Two types of fuel microparticles 15 and 16, and electrolyte liquid 18, are mixed to form a fuel slurry and injected into separate sides of the battery cell having an ion permeable membrane partition 17. Two battery current contacts 19a and 19b are connected to the electrode plates 13a and 13b, and are extended through the exterior wall of the electrochemical cell container.

Electrode Plates

Figure 2:
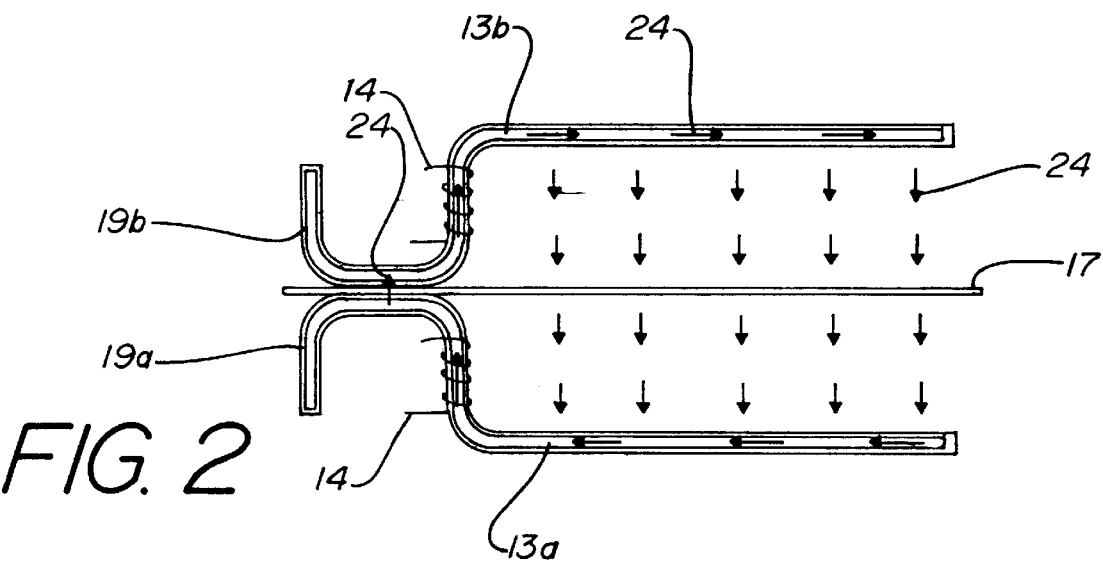
FIG. 2 shows a representation of one embodiment of the battery electrode plate used in the present invention.

One embodiment of the battery electrode plates 13a and 13b is illustrated in FIG. 2. In this embodiment, the two battery electrode plates 13a and 13b are identical and interchangeable and are manufactured with a core of ferromagnetic material such as steel that is plated or intimately coated with a conductor material, preferably one that does not interact with the electrolyte. These electrodes collect the electrical and ion currents from the fuel microparticles and conduct the current from the interior of the cell container to the battery current contacts 19a and 19b, respectively. The battery electrode plates also serve to conduct the magnetic field 24 from the magnetic field windings 14 into the microparticle fuel slurry, thereby attracting the fuel microparticles to the electrode plates and into electrical contact with the electrode plates.

The battery electrode plates are insulated from each other with an insulator and ion permeable membrane 17 as shown in FIG. 2. In this embodiment, the battery electrode plates are configured to minimize the magnetic field path by being positioned in close proximity to each other when they are out of contact with microparticle fuel slurry. The battery electrode plates also serve as the current contacts 19a and 19b to the electrode cell container. It should be noted that the magnetic field produced by the ferromagnetic core electrode plates and the magnetic windings can be either continuous, intermittent or of alternating polarity, depending upon the mode of cell operation. Furthermore, because it is only necessary that the core of the electrode plates interact with a magnetic field such that the fuel microparticles are attracted to the plates, the core of the battery electrode plates can be fabricated of a permanent magnet material to eliminate the necessity of the magnetic field windings. However, the use of a ferromagnetic core and active magnetic field windings permits a variety of advantageous methods of operation and refueling that will be further disclosed herein.

Fuel Microparticles and Electrolyte

In the practice of this invention, fuel microparticles having an electrochemical coating bonded to the exterior of the microparticles are utilized. The electrochemical material bonded to the microparticle fuel spheres is selected from an electrochemical couple sufficient to supply sufficient energy for the battery system application. The electrochemical material is bonded to the fuel microparticles by means of coating, plating, deposition, or chemical reaction. By bonding the electrochemical material to the exterior of the fuel microparticles distinct advantages are realized such that the active material density and thus the electrochemical energy density at the electrode surface is much larger than can be obtained with absorbed gases and liquids in a ferromagnetic carrier material.

Figure 3:
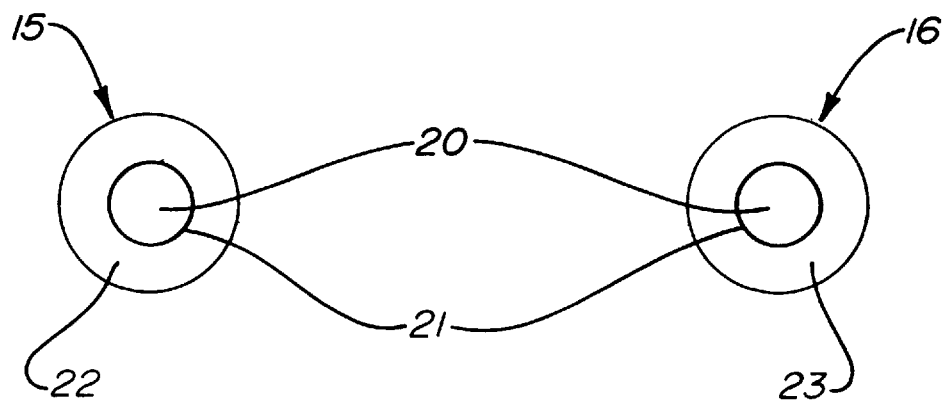
FIG. 3 shows a cross-sectional representation of the two components of a dual microparticle fuel slurry that serve as battery fuel in one embodiment of the present invention.

In the battery system of this invention, fuel microparticles are mixed with liquid electrolyte to form a fuel slurry. One embodiment using two types of fuel microparticles 15 and 16 to form dual microparticle fuel slurries is shown in FIG. 3. In this embodiment, both types of fuel microparticles contain a ferromagnetic core 20 that is surrounded by either an insulating or a conducting layer 21. For example, an insulating layer, such as $SiO_2$ or carbon like diamond can be used if the ferromagnetic core material is susceptible to the electrolyte or the ferromagnetic materials interferes with the electrochemical reaction. A conducting layer such as Nickel, or even Iron, can be used to enhance the chemical reaction as in the Sturm patent. In turn, the insulating layer of the type A battery fuel microparticle 15 is surrounded by a layer of one component of the battery electrochemical couple 22, while the insulating layer of the type B fuel microparticle 16 is surrounded by the second component of the battery electrochemical couple 23. The insulating layer 21 serves to isolate the ferromagnetic material from the electrolyte and fuel materials, while the ferromagnetic particle core 20 acts to move the entire fuel particle to the electrode plate in response to the magnetic field produced by the magnetic field windings around the battery cell plates, thereby bringing the fuel particle and electrode plate into electrical contact. Note that an insulating layer is not necessary in all cases, but is possible as demonstrated by experiments. Because it is only necessary that the core of the fuel microparticles interact with a magnetic field such that the microparticles are attracted to the electrode plates, the core of the fuel microparticles could be fabricated with a permanent magnet material instead of the ferromagnetic core to eliminate the need for an external magnetic field. However, the use of a ferromagnetic material and active magnetic field windings permits a variety of advantageous methods of operation and refueling that will be further disclosed herein.

In one embodiment of the fuel microparticles of the present invention, the type A fuel electrochemical material 22 is lead-oxide while the type B fuel material 23 is pure lead. In this embodiment both of these fuel microparticles are suspended in sulfuric acid electrolyte to form a lead-acid battery system. During discharge at the negative electrode, the reaction occurring is $$Pb+H_2SO_4 \rightarrow PbSO_4$$

while at the positive electrode, the reaction is $$PbO_2+H_2SO_4 \rightarrow PbSO_4$$

These reactions continue until a portion or all the initial lead and lead-oxide fuel have been converted to $PbSO_4$ and the fuel slurry is completely discharged and spent. In the operation of this embodiment, each component of the dual microparticle fuel slurry is poured into its corresponding battery cell to activate the battery, and after the fuel has been utilized and spent the remaining residue is drained and recharged off-site. In all embodiments of this invention, the point at which a sufficient amount of fuel has been converted so as to require replacement (or being "spent") depends on the needs of the particular battery system application.

Table 1 lists a number of exemplary electrochemical couples that can be used to coat the fuel slurry microparticles in the practice of this invention.

TABLE 1

Examples of Replaceable Battery Fuel Sphere Coatings

| Battery Type | Fuel A | Fuel B |
|---|---|---|
| Lead-Acid | Pb-Lead | $PbO_2$-Lead DiOxide |
| Zinc-Metal Hydryde | Zn-Zinc | Metal Hydryde |
| Zinc-air | Zinc | air (oxygen) |

Figure 4:
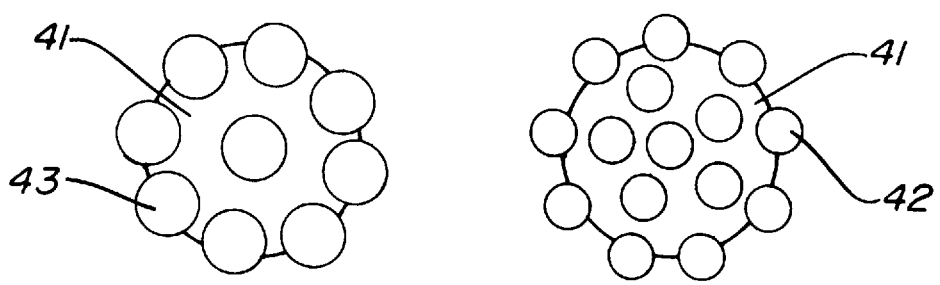
FIG. 4 shows a representation of C60 fullerene microparticle fuel spheres having alkali metal and halogen atoms bonded to the outside of the carriers

The fuel microparticles used in this invention can be any size from the macroscopic to the microscopic. An example of small fuel particles that can be used are C60 Fullerenes containing a ferromagnetic atom inside the Fullerene carbon sphere 41, and having alkali metal atoms 42 such as Li, and halogen atoms 43 such as Cl, attached to the outside of the fullerene 41. The carbon bonding electrons in the 2s and 2p orbitals are hybridized such that they can form four equal bonds as in diamond. The Fullerene structure makes available a number of bonding sites on the Fullerene surface 41, as illustrated in FIG. 4

Magnetic Field Geometry

Figure 5A:
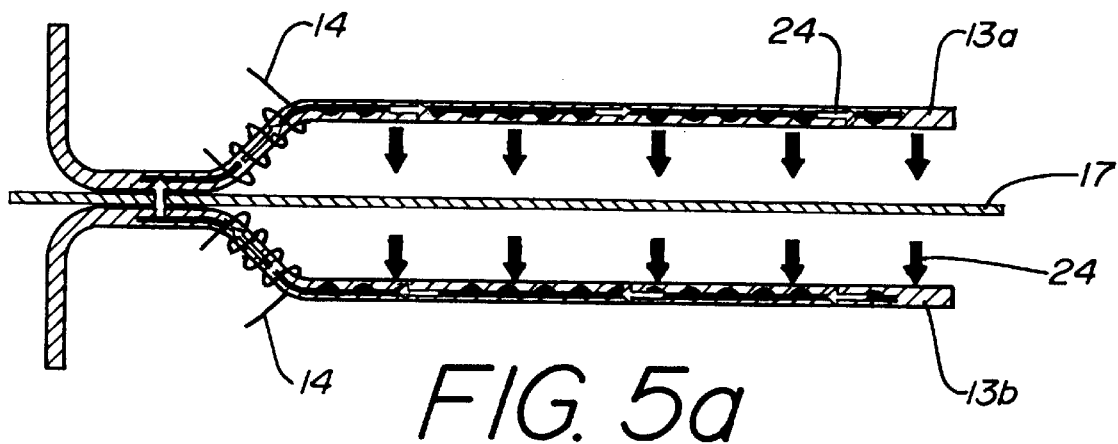
FIGS. 5a and 5b depict the magnetic field geometry used to connect fuel microparticles to battery electrodes in the practice of one embodiment of this invention.
Figure 5B:
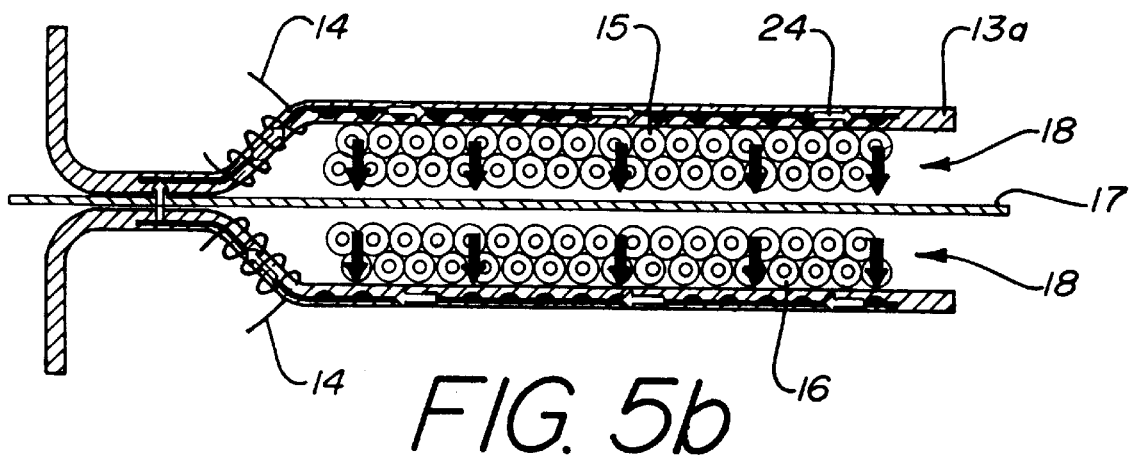

The magnetic field geometry of one embodiment of the present invention is depicted in FIGS. 5a and 5b. The magnetic field concept of this embodiment is shown without fuel microparticles in FIG. 5a to illustrate magnetic field path, and with fuel microparticles in FIG. 5b. The electrode structure and electrochemical cell container case are designed to optimize and complete the magnetic field path through the electrode structure as illustrated in FIGS. 5a and 5b.

Figure 6:
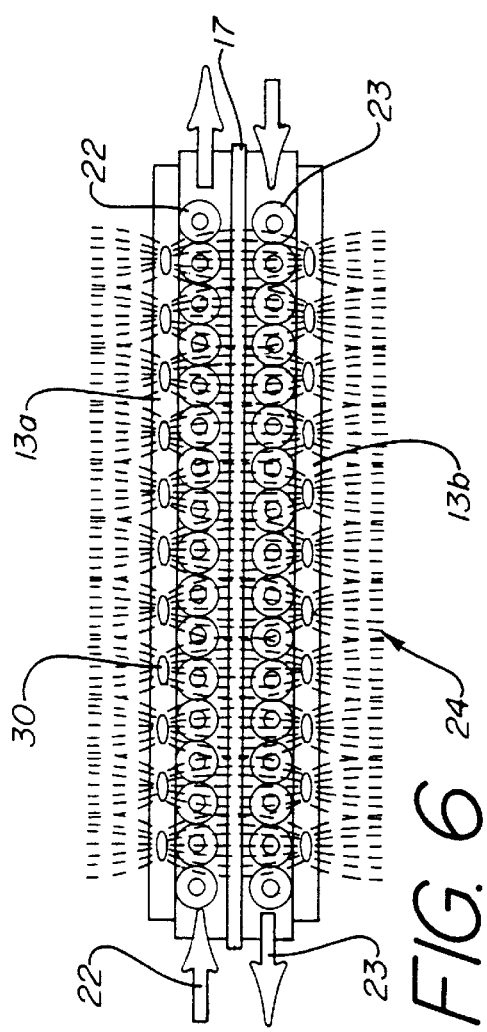
FIG. 6 shows a representation of a battery electrode embodiment utilizing a magnetic field external to the battery cell.

There are several possible manifestations of the magnetic field geometry. In some embodiments of this invention, an internal magnetic field is used to connect ferromagnetic fuel microparticles to the battery electrodes. For the ferromagnetic core of the microparticles to respond to the internal magnetic force, the magnetic field must have a spatial gradient such that the maximum magnetic field strength is located at the battery electrodes causing the fuel microparticles to move toward the battery electrode plates. As an alternative to an internal magnetic field, an external magnetic field gradient can be formed using a non-uniform ferromagnetic material geometry internal to the conducting battery electrodes as illustrated in FIG. 6, in which parallel ferromagnetic rods 30 are used. In this embodiment of the invention, an external magnetic field concentrates in the ferromagnetic rods, but expands in the region between the battery electrode plates, 13a and 13b. In the event that a permanent internal magnetic field is desired, the ferromagnetic rods can be replaced with permanent magnetic rods that generate a magnetic field and provide the spatial magnetic field gradient necessary to attract the fuel microparticles to the electrodes.

Multiple Cell Battery System

Figure 7:
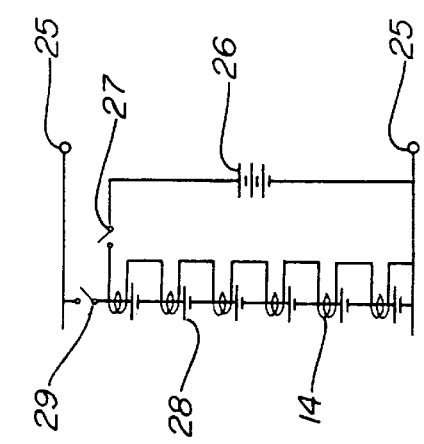
FIG. 7 shows a schematic representation of one embodiment of this invention having multiple electrical chemical cell containers connected in series.

In the practice of this invention, a single electrochemical cell container may be operated alone, or in combination with other cell containers. In either case, the battery system is operated in the following manner. The two compartments of the electrochemical cell container are filled with two compatible, ferromagnetic slurry components via fuel inlets 11a and 11b as illustrated in FIG. 1. Since the voltage generated by a single battery cell is nominally between 1 and 7 volts, a number of cell containers are commonly connected in series to develop the voltage required for a specific application. In the embodiment of this invention illustrated in FIG. 7, multiple electrochemical cell containers 28 are connected in series to obtain the desired output voltage at the battery output terminals 25. Electric current from a power source 26, such as a separate starter battery is used to energize the series-connected magnetic field windings 14 by closing winding-switch 27 as illustrated in FIG. 7. Referring to FIG. 1 and FIG. 7, energization of the magnetic field windings 14 generates a magnetic field that causes the fuel microparticles 15 to collect on electrode plate 13a and the fuel microparticles 16 to collect on electrode plate 13b. In one embodiment, the magnetic field windings can be placed in series with the battery output terminal so as to use the electrical current being generated by the battery system to increase the magnetic field strength attracting the fuel microparticles to the battery electrode plates. The magnetic field windings can also be switched to be in parallel with the battery system after it has begun generating voltage. A number of electrochemical cell containers 28 are then connected in series with the battery output terminals 25 by closing cell-switch 29 and current is drawn from the battery system. The electrochemical energy is then depleted by removing electrical current from the battery system through the fuel microparticles, the electrode plates and the battery electric current contacts 19a and 19b.

After the electrochemical energy in the fuel slurry has been depleted, the current through the magnetic field windings 14 is reversed or turned off by opening winding-switch 27, the battery is disconnected from the load or battery terminals by opening cell-switch 29 and the spent fuel microparticles are removed with the fuel slurry from the battery cells via fuel outlets 12a and 12b. The battery system is then refueled and the process repeated.

Figure 8:
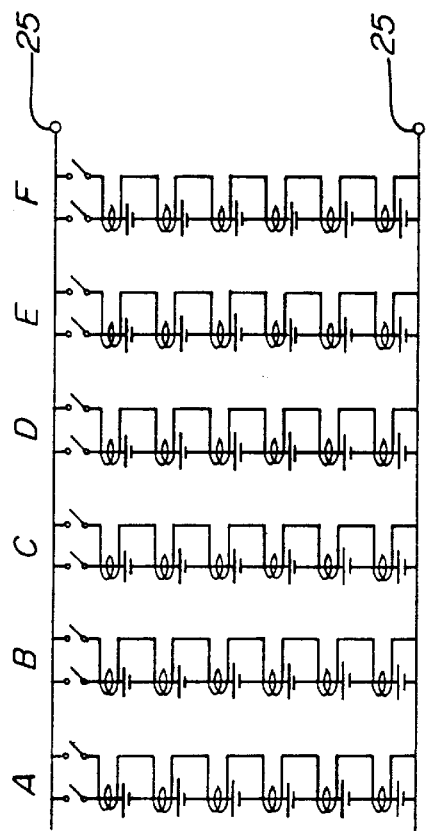
FIG. 8 shows a schematic representation of one embodiment of this invention having multiple sets of series electrochemical cell containers operating in parallel.
Figure 9:
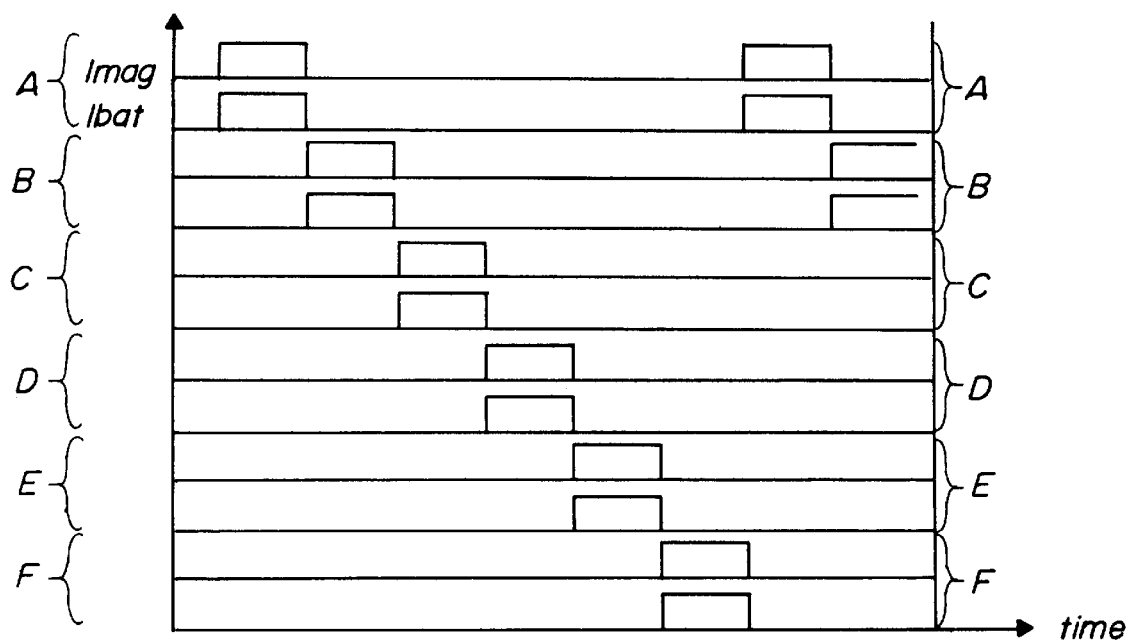
FIG. 9 is a time-based graphical representation of one possible scheme for applying magnetic field winding currents and generating battery currents for an embodiment of this invention having multiple sets of series battery cells operating in parallel.

The combination of a number of electrochemical cell containers into groups offers significant operational advantages. One such advantage is allowing the battery system to supply current continuously, while being recharged. When replacing the spent fuel slurry with unspent fuel slurry during the recharging process, it is generally necessary to remove the magnetic field holding the fuel microparticles to the electrode plates. Therefore, to produce continuous current during this operation, it is necessary to provide a substitute means for supplying current while the cell container is off-line for fueling. In the practice of this invention, however, several options are available for replacing the microparticle fuel slurry on an as-needed basis while the battery is producing electrical current. One method of accomplishing this task is to use multiple sets of series electrochemical cell containers operating in parallel as illustrated in FIG. 8. In this embodiment, one or more sets of cell containers are generating current while others are being fueled. For the embodiment of FIG. 8, one possible scheme for alternating the magnetic field winding currents and battery currents of the sets of cell containers is illustrated as a function of time in FIG. 9. As an alternative, a number of series cell container sets could be used in parallel to provide surge requirements. As a further alternative, a number of groups of series cell container sets can be used in parallel and operated and refueled in a sequential manner similar to that employed with the series cell container sets previously described. In yet another, an electromagnetic pump is used to move the fuel slurry through the electrochemical cell containers continuously while converting the electrochemical energy to electrical energy. In these embodiments, the pump can be configured to continuously circulate the fuel, or to pump spent fuel from the cell container into a spent fuel storage means and replace it with unspent fuel drawn from an unspent fuel storage means. Since electromagnetic pumps set up a moving magnetic field based on temporal and spatial variations in a magnetic field, the electrical energy generated by sequential activation of multiple series cell container sets or groups can be used to activate the electromagnetic fuel pump through the series-connected cell containers. In addition, the fuel can be cycled through a number of parallel cells in order to distribute any heat dissipation in the event that not all of the cells are needed to deliver the power required by the system. Thus, the individual electrochemical cells can be multiplexed to a single load or multiple loads.

Figure 10:
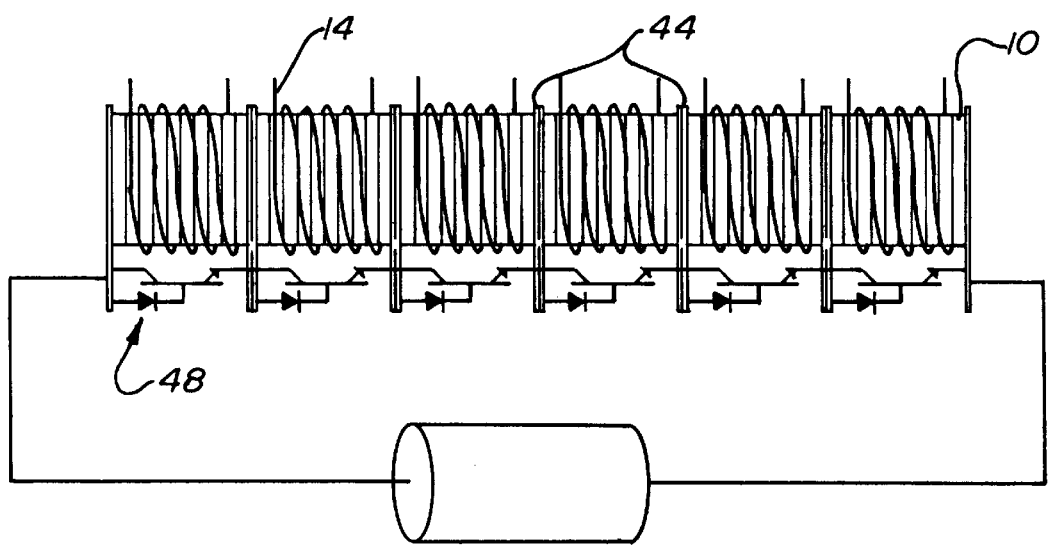
FIG. 10 illustrates one embodiment of this invention having a magnetically controllable power output.

Another major advantage possible using groups of microparticle slurry fuel cells in the practice of the present invention is the ability to control the battery power output within the battery by externally controlling the magnetic field. One embodiment that achieves this advantage is shown in FIG. 10. This embodiment takes advantage of the fact that in the absence of the magnetic field, the battery cell impedance is large and the current is low. This fact allows the battery to be turned on and off by controlling the application of the magnetic field. In the embodiment of FIG. 10, a stack of fuel cells is divided into major sub-units 44, each of which can be activated as required. In this manner, each of the individual cells always operates at the optimum current density, but the number of cells in series is controlled to match the load requirements. During operation, the number of active sub-units 44 can be varied so that all or only part of the battery is used, and damaged cells can be bypassed in real time. The semiconductor diodes 48 and transistors are used to bypass a battery cell that is not used, that is not producing voltage or current to eliminate electrolyte evaporation and heating.

Figure 11B:
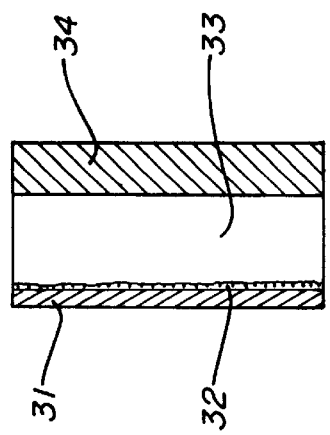
FIGS. 11a and 11b show cross-sectional representations of the electrochemical configuration of a conventional lead-acid battery of the prior art in the charged and discharged states, respectively.
Figure 11A:
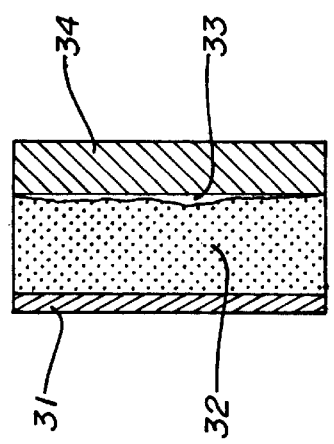

One application where the battery cell system of the present invention offers significant advantages is as a power source for electro-motive vehicles. As illustrated in FIGS. 11a and 11b, the present contender for electro-motive vehicle applications, the conventional lead-acid battery, is characterized by a structure in which the electrochemical fuel is stored in the same region where the chemical to electrical energy conversion occurs. In such a conventional battery, the battery electrode or plate support 31 is usually fabricated from a lead or metallic matrix to support the battery fuel. Two opposing plates form a single cell that generates an open circuit voltage of approximately 1–2 Volts with a current determined by the cross sectional area of the cell. Each plate is coated with a thick layer of active material 32 that is either oxidized or reduced during current generation so as to produce electron (current) flow in the external circuit. In a conventional charged lead-acid battery, one of the electrode plates is coated with a layer of lead-oxide, $PbO_2$, while the opposing plate is coated with a layer of lead, Pb. FIG. 11a illustrates a charged battery plate, coated with active material 32, immersed in an electrolyte 34 while FIG. 11b illustrates a discharged battery plate immersed in an electrolyte 34. Electrochemical energy conversion occurs at the surface of the active material 32 exposed to the electrolyte 34 where the active material 32 is converted to inactive material 33 until the majority of the active material is inactive and the battery is discharged as shown in FIG. 11b. The conversion of material from active to inactive is reversed when the conventional battery is charged, and this discharge/charge cycle is repeated many times during the life of the battery.

The structure and operating characteristics of a conventional battery are not fully compatible with electro-motive vehicle operation for several reasons: 1) limited battery lifetime due to changes in the characteristics of the battery electrochemical materials, 2) increased battery resistance and dissipation over time, 3) lengthy and impractical recharge times, and 4) the necessity for the implementation of an extensive and costly change in the automotive fuel distribution infrastructure to accommodate conventional battery use. Accordingly, one embodiment of the present invention changes the paradigm of electrochemical energy storage and energy conversion from that of a conventional battery to that of a microparticle slurry fuel cell.

The target parameters for one embodiment of a magnetic microparticle fuel cell that is compatible with electric vehicle use are a peak acceleration power of about 150 kw (200 hp), a long term cruise capability of about 15 kw (20 hp), a loaded source voltage of about 36 volts, and a current density of about 0.5 A/cm². These parameters require a cell power density of about 0.5 watt/cm$^3$, an area impedance to be less than about 0.1 ohm/cm$^2$/cell resulting in a volume of about 3000 cm$^3$, representing the approximate size of a V-8 engine in internal combustion automobiles.

Figure 12:
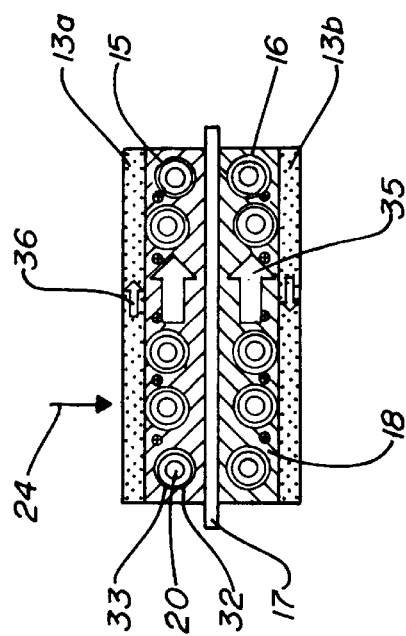
FIG. 12 shows a cross-sectional representation of the construction of an electrochemical cell container of this invention.

As illustrated in FIG. 12, in one embodiment of the present invention compatible for use in an electric vehicle, microparticles of active battery material 15 and 16 are moved through a battery along the battery plate structure with flowing electrolyte 18 in the direction indicated by arrow 35. Both types of microparticles consist of ferromagnetic material 20, coated with active material 32, with the surface of the microparticle being converted to inactive material 33 and producing current flow 36 in the external circuit. Magnetic forces 24 are used to attract and contact the microparticles to the electrodes with the magnetic force acting on any given microparticle in the uniform magnetic field being due to gradients in that field. One particular advantage of this embodiment for electro-motive vehicle application is that the liquid electrolyte microparticle fuels can be distributed using existing liquid fuel marketing outlets such as gas stations.

Figure 13:
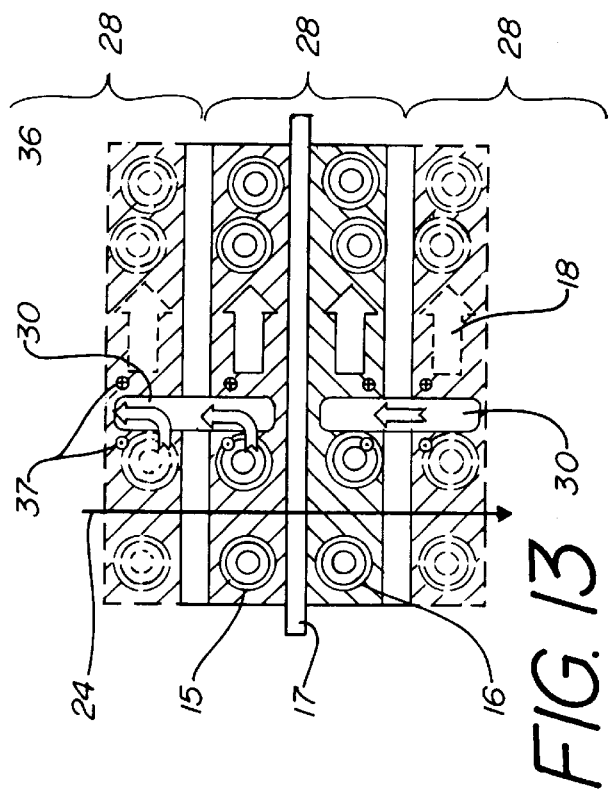
FIG. 13 shows a cross-sectional representation of one embodiment of this invention having a self-current magnetic field contact geometry.

In the embodiment of this invention shown in FIG. 13, an electrode geometry is used that takes advantage of the magnetic field produced by the battery current to produce a gradient magnetic field. In this embodiment, the electrode is made up of a number of structures, such as bars and rods 30, that contact the microparticles 15 and 16, and conduct the current to the next series cell 28. The current in the rod 30 produces a magnetic field 37 that varies as $1/r^2$ where r is the distance of the particle from the center of the bar. As the current through the cell increases, the magnetic force attracting the particle to the rod increases in a way so as to reduce the series resistance. Thus this embodiment is used to reduce the cell resistance during high current discharge. In this embodiment, the magnetic field produced at low currents would be designed to be less than the standard magnetic field such that the microparticles could be replaced between surges. Note this mode of operation serves to improve the electric vehicle power demand cycle in which the vehicle accelerates to cruise speed, requiring a large current, and then cruises for an extended period of time. The self magnetic field will reduce the power source internal resistance during acceleration, but not affect the lower current cruise operation.

Figure 14:
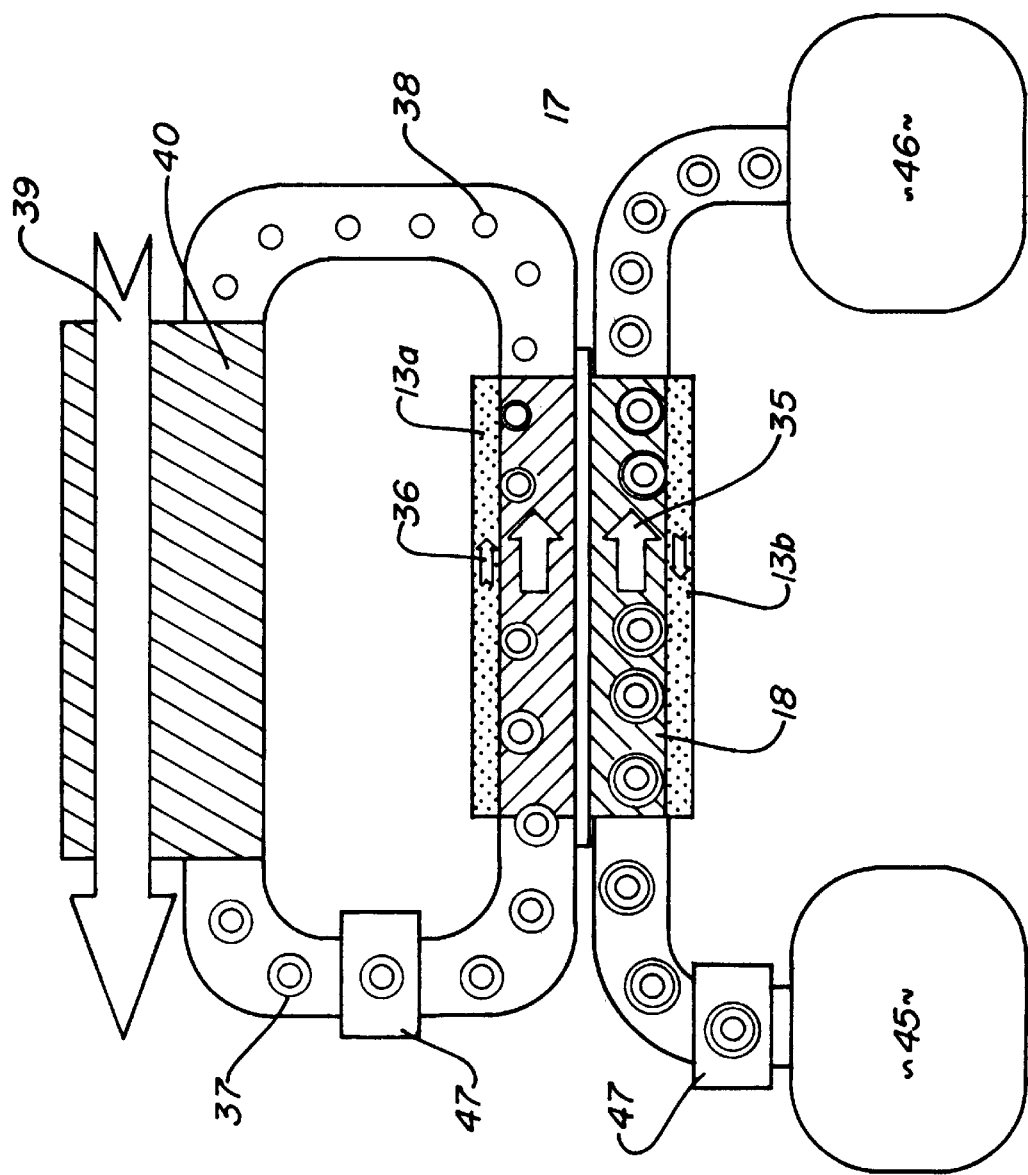
FIG. 14 shows a representation of an electrochemical cell container having iron or iron coated microparticles that are oxidized by contact with the atmosphere.

The fuel cell embodiment shown in FIG. 14 uses a ferromagnetic material, such as iron to form the microparticles 37 and 38 of a working fluid that collects oxygen from the air 39 using an absorption cell 40 and transports the oxygen into the fuel cell for reaction. Electromagnetic pumps 47 move the fuel slurries through the electrochemical cell containers. The great advantage offered by this embodiment is a reduction in the amount of one type of fuel, oxygen, that must be carried on board the vehicle. This embodiment also offers the advantage of increasing the density of oxygen reactant available for reaction over that of an air battery system using conventional porous electrodes. In the operation of this embodiment, one side of the battery cell uses microparticles constructed of a material that absorbs oxygen on contact with air. The oxygen laden microparticles 37 are formed by contact with air flow 39 in an absorption cell 40, and the oxygen depleted microparticles 38 are formed by contact with the electrode plate 13a. This embodiment collects oxygen from the air on a large surface area medium, the microparticles, and conveys the oxygen directly to the electrode via the slurry. Thus this embodiment increases the oxygen density at the electrode surface because of the surface area available.

In addition to the embodiments disclosed above, other variations of the present invention are possible. For example, the fuel cell of the present invention can utilize other plate geometries that serve to better focus the application of the magnetic field to the electrolyte slurry of microparticle fuel spheres, or which reduce the magnetic field energy. The fuel spheres may also be manufactured in different geometries.

Although the invention has been described by reference to preferred embodiments, it is not intended that the novel systems, processes, methods, compositions and structures be limited thereby but various modifications are intended to be included as falling within the spirit and broad scope of the foregoing disclosure and the following claims.

What is claimed is:

1. An electrochemical battery system comprising:

at least one electrochemical cell container comprising an anode compartment and a cathode compartment separated by an ion permeable membrane;

at least one electrode plate positioned within each of said anode and cathode compartments of said electrochemical cell, each said electrode plate comprising a core that is capable of using a magnetic field to attract ferromagnetic or magnetic materials;

a liquid electrolyte present within each of said anode and cathode compartments, said electrolyte being in contact with each of said electrode plates;

a plurality of microparticle fuel spheres mixed with said electrolyte so as to form a fuel slurry within each of said anode and cathode compartments, said microparticle fuel spheres comprising a core that is capable of interacting with a magnetic field in such a way that said microparticle fuel spheres are attracted to and held near each said electrode plate;

an electrochemical coating bonded to said microparticle fuel spheres located in said cathode compartment, said electrochemical coating comprising a component of a battery electrochemical couple having a higher reduction potential;

an electrochemical coating bonded to said microparticle fuel spheres located in said anode compartment, said electrochemical coating comprising a component of said battery electrochemical couple having a lower reduction potential; and at least one battery current contact connected to each said electrode plate, each said battery current contact comprised of an electrically conductive material and extending through an exterior wall of each said cathode compartment and anode compartment of each said electrochemical cell.

2. The system of claim 1, wherein each said microparticle sphere is comprised of a ferromagnetic core surrounded by a coating of electrically conductive or insulative material.

3. The system of claim 2, wherein each said electrode plate is comprised of an electrically conductive material that is non-reactive with said electrolyte and can shape, conduct, or generate a magnetic field.

4. The system of claim 2, wherein each said electrode plate is comprised of an electrically conductive material that is non-reactive with said electrolyte; and further comprising magnetic field windings encircling a portion of each said electrode plate, said magnetic field windings connected to a power source for supplying current to said windings and thereby capable of generating a magnetic field that is capable of being conducted by said electrode plates.

5. The system of claim 3, wherein each electrode plate is comprised of steel.

6. The system of claim 4, further comprising at least one fuel inlet and at least one fuel outlet positioned within said exterior wall of each said cathode and anode compartment of each said electrochemical cell container.

7. The system of claim 4, wherein said magnetic field windings are connected in parallel or series with said battery current contacts of said electrochemical battery system.

8. The system of claim 1, further comprising at least one fuel inlet and at least one fuel outlet positioned within said exterior wall of each said compartment; and a pumping means for supplying unspent fuel slurry to said fuel inlet of each said compartment and for removing spent fuel slurry from said fuel outlet of each said compartment.

9. The system of claim 8 wherein said electrode plate is comprised of a ferromagnetic core surrounded by a coating of electrically conductive material that is non-reactive with said electrolyte; and further comprising magnetic field windings encircling a portion of each said electrode plate, said magnetic field windings connected to a power source for supplying current to said windings and thereby capable of generating a magnetic field that is capable of being conducted by said electrode plates.

10. The system of claim 9 wherein said power source is capable of supplying current to said magnetic field windings intermittently.

11. The system of claim 10, further comprising an unspent fuel storage means connected to said fuel inlet and a spent fuel storage means connected to said fuel outlet of each said compartment, said unspent fuel storage means for holding a quantity of unspent fuel slurry capable of being supplied to each said compartment by said pumping means, and said spent fuel storage means for holding a quantity of spent fuel slurry capable of being removed from each said compartment by said pumping means.

12. An electrochemical battery system comprising:

a plurality of electrochemical cell containers comprising an anode compartment and a cathode compartment separated by an ion permeable membrane;

at least one electrode plate positioned within each of said anode and cathode compartments of said electrochemical cells, each said electrode plate comprising a core that is capable of using a magnetic field to attract ferromagnetic or magnetic materials;

a liquid electrolyte present within each of said anode and cathode compartments, said electrolyte being in contact with each of said electrode plates;

a plurality of microparticle fuel spheres mixed with said electrolyte so as to form a fuel slurry within each of said anode and cathode compartments, said microparticle fuel spheres comprising a core that is capable of interacting with a magnetic field in such a way that said microparticle fuel spheres are attracted to and held near each said electrode plate;

an electrochemical coating bonded to said microparticle fuel spheres located in said cathode compartment, said electrochemical coating comprising a component of a battery electrochemical couple having a higher reduction potential;

an electrochemical coating bonded to said microparticle fuel spheres located in said anode compartment, said electrochemical coating comprising a component of said battery electrochemical couple having a lower reduction potential;

at least one battery current contact connected to each said electrode plate, each said battery current contact comprised of an electrically conductive material and extending through an exterior wall of each said cathode compartment and anode compartment of each said electrochemical cell; and a positive battery output terminal connected in series with at least one said battery current contact extending through said exterior wall of said cathode compartment, and a negative battery output terminal connected in series with at least one said battery current contact extending through said exterior wall of said anode compartment.

13. The system of claim 12, wherein said electrochemical battery system comprises a plurality of electrochemical cell containers connected in series, said electrochemical cell containers being further connected to said battery output terminals.

* * * * *